United States Patent [19]

Fujisawa et al.

[11] Patent Number: 5,656,245
[45] Date of Patent: Aug. 12, 1997

[54] CATALYTIC CONVERTER FOR CLEANING EXHAUST GAS

[75] Inventors: Katsuhide Fujisawa; Masakatsu Takahashi; Makoto Tajima, all of Yamato, Japan

[73] Assignee: Nippon Reinz Co., Ltd., Kanagawa, Japan

[21] Appl. No.: 557,858

[22] Filed: Nov. 14, 1995

[51] Int. Cl.⁶ .................................................. B01D 50/00
[52] U.S. Cl. ..................... 422/179; 422/180; 422/181; 60/299; 29/890
[58] Field of Search .................... 422/171, 172, 422/177, 178, 179, 180, 181; 60/295, 299, 300; 29/890

[56] References Cited

U.S. PATENT DOCUMENTS 5,468,384  11/1995  Garcera et al. ................. 210/232

FOREIGN PATENT DOCUMENTS

| 2 211 522 | 9/1973 | Germany . |
|---|---|---|
| 2 213 540 | 10/1973 | Germany . |
| 25 25 660 | 6/1975 | Germany . |
| 23 64 425 | 7/1975 | Germany . |
| 25 25 661 | 12/1975 | Germany . |
| 7302006 | 2/1973 | Netherlands . |

*Primary Examiner*—Christopher Kim
*Attorney, Agent, or Firm*—Koda and Androlia

[57] ABSTRACT

The disclosure relates to a catalytic converter for cleaning exhaust gas generated from automobiles or the like and more particularly to a structure for securing a catalyst carrier to a casing.

In the converter, a casing for embracing, supporting and securing the catalyst carrier is provided with at least one end cover at the one end of the casing in the longitudinal direction thereof, the catalyst carrier is secured to the one end cover, but not secured to the remainder of the casing. The catalyst carrier may be secured to the end cover by sandwiching the flange portion of the catalyst carrier between the vertical step portion of the end cover and a pushing ring via buffering members. Alternatively, the catalyst carrier may be secured to the end cover by pushing a taper bushing having a wedge-shaped cross section into the space between the concave recessed portion provided on the surface of the catalyst carrier and the short pipe portion of the end cover. Mesh washers formed from a knitted metal wire mesh can be used for the buffering members.

8 Claims, 3 Drawing Sheets

CATALYTIC CONVERTER FOR CLEANING EXHAUST GAS

BACKGROUND OF THE INVENTION

1. Field of the Invention

The present invention relates to a catalytic converter for cleaning exhaust gas and combustion gas generated from automobiles or the like and more particularly to a supporting structure for securing a long catalyst carrier to a casing.

2. Prior Art

In a conventional ceramic honeycomb catalytic converter, a vertical sectional view of a typical example of a supporting structure for supporting and securing a ceramic honeycomb catalyst carrier by using a casing is shown in FIG. 1. Numeral 1 designates a ceramic honeycomb catalyst carrier. The carrier 1 has an external shape of a cylinder, such as a circular cylinder and is provided with a plurality of minute holes passing through in the longitudinal direction thereof and arranged in a honeycomb shape so as to hold catalysts for cleaning exhaust gas and combustion gas on the wall surfaces of the minute holes. Numeral 2 designates a mesh washer formed from a knitted wire mesh. The mesh washers 2 are mounted as buffering members between a two-split metal casing 4 and the honeycomb catalyst carrier 1 so as to embrace the entire circumferences of shoulder portions disposed at both ends of the honeycomb catalyst carrier 1 in the longitudinal direction thereof. Numeral 3 designates a mesh supporter mounted as a buffering member between the outer peripheral surface of the honeycomb catalyst carrier 1 and the casing 4. The honeycomb catalyst carrier 1 is secured to the casing 4 via the mesh washers 2 at both ends thereof. The difference in thermal expansion and contraction between the ceramic honeycomb catalyst carrier 1 and the metal casing 4 is absorbed by the metal washers 2 used as buffering members.

These days, it is required that the length of the honeycomb catalyst carrier be extended to enhance the cleanliness of exhaust gas and combustion gas. In the conventional supporting structure described above, since the honeycomb catalyst carrier is secured to the casing at both ends thereof, the difference in thermal expansion and contraction between the honeycomb catalyst carrier and the casing over the entire length of the honeycomb catalyst carrier must be absorbed by the metal washers. Accordingly, as the length of the honeycomb catalytic carrier is extended, the mesh washers cannot absorb the difference in thermal expansion and contraction between the honeycomb catalyst carrier and the casing. Therefore, at high temperatures, the supporting structure loses force for carrying the ceramic honeycomb catalyst carrier having smaller thermal expansion, thereby allowing the honeycomb catalyst carrier to move in the casing and inducing the danger of cracking or chipping the catalyst carrier. If the supporting structure is designed to keep sufficient holding force during high-temperature expansion to prevent such a problem, the metal washers are compressed excessively at low temperatures, thereby inducing the danger of cracking and chipping the honeycomb catalyst carrier.

The present invention is intended to solve the above-mentioned problems. The object of the present invention is to provide a ceramic honeycomb catalytic converter having a catalyst carrier supporting structure which does not cause the problem of losing the supporting force for securing the catalyst carrier owing to the difference in thermal expansion and contraction between the ceramic honeycomb catalyst carrier and the metal casing embracing the carrier, thereby preventing the problem of cracking and chipping the honeycomb catalyst carrier even when the length of the honeycomb catalyst carrier is extended.

SUMMARY OF THE INVENTION

To achieve the above-mentioned object, the catalytic converter for cleaning exhaust gas in accordance with the present invention comprises a catalyst carrier being made of ceramics, carrying catalysts therewith for cleaning exhaust gas passing therethrough and having an external shape of a cylinder, a metal casing for embracing, supporting and securing the catalyst carrier, and buffering members intervened between the casing and the catalyst carrier respective if on both sides thereof, wherein the casing is provided with at least one end cover separate from a main portion of the casing at the one end of the casing in the longitudinal direction thereof, and the catalyst carrier is secured only to the one end cover via the buffering member and not secured to the remainder of the casing.

The securing of the catalyst carrier to the end cover at the one end of the casing can be performed by using the structure described below. That is, the end cover comprises a annular plate portion made of a ring-shaped flat plate disposed perpendicularly to the longitudinal direction of the casing and a sleeve portion extending from the outer peripheral fringe of the annular plate portion in the longitudinal direction of the casing; the end portion of the catalyst carrier covered with the end cover is provided with a flange portion projecting outward from the outer peripheral surface; the one end cover side buffering member comprises two separate ones: a first one and a second one; the end surface of the flange portion and the step portion on the opposite side thereof are pressed by a pushing ring via the first buffering member so that the end surface of the flange portion is pressed against the annular plate portion of the end cover via the second buffering member; and the pushing ring is firmly secured to the sleeve portion of the end cover by welding or the like.

Alternatively, the structure described below may be employed. That is, on the outer peripheral surface of the one end of the catalyst carrier, an annular plate recessed portion, instead of the flange portion, having an outer peripheral surface tapered inward in the longitudinal direction from the end surface is provided; on the surface of the recessed portion and the end surface of the catalyst carrier adjacent thereto, a ring-shaped buffering member is mounted; the end cover provided with the annular plate portion and the sleeve portion is mounted to cover the ring-shaped buffering member so that the annular plate portion comes into contact with the end surface via the buffering member; a annular plate taper bushing having a wedge-shaped cross section is pushed into the space between the buffering member mounted on the concave recessed portion of the catalyst carrier and the inner peripheral surface of the sleeve portion; and the taper bushing is firmly secured to the sleeve portion by welding or the like.

Mesh washers formed from a knitted wire mesh of a metal wire can be used for such buffering members.

In the catalytic converter for cleaning exhaust gas in accordance with the present invention, the casing may be inclined in the axial direction thereof so that the end cover for securing the catalyst carrier is positioned downward.

In the catalytic converter for cleaning exhaust gas in accordance with the present invention, since the ceramic catalyst carrier is secured only to the end cover provided at the one end of the metal casing and not secured to the remainder of the casing, the buffering member intervened between the catalyst carrier and the casing at the securing portion is used to absorb the difference in thermal expansion and contraction generated between ceramics and metal over the length of the securing portion for locally securing the catalyst carrier, that is, in the case of the embodiments of the present invention, the difference in thermal expansion and contraction generated between ceramics and metal at the flange portion provided at the one end portion of the catalyst carrier in the longitudinal direction thereof. Therefore, the buffering member is required to absorb a small difference in thermal expansion and contraction. That is to say, in the present invention, the buffering member intervened at the securing portion of the catalyst carrier, i.e., the one end cover side thereof, is irrelevant to the difference in thermal expansion and contraction of the entire length of the catalyst carrier and the entire length of the casing. Therefore, the buffering member is not affected by such a difference. Accordingly, in the present invention, even when the length of the catalyst carrier is extended, the supporting structure is free from the problem of losing supporting force for supporting and securing the catalyst carrier owing to the difference in thermal expansion between the catalyst carrier and the casing and the problem of allowing the catalyst carrier to move and damaging the carrier.

In all the drawings, the details of the cross sections of honeycomb catalyst carriers 1 and 11 are omitted.

DETAILED DESCRIPTION OF THE PREFERRED EMBODIMENTS

Figure 2:
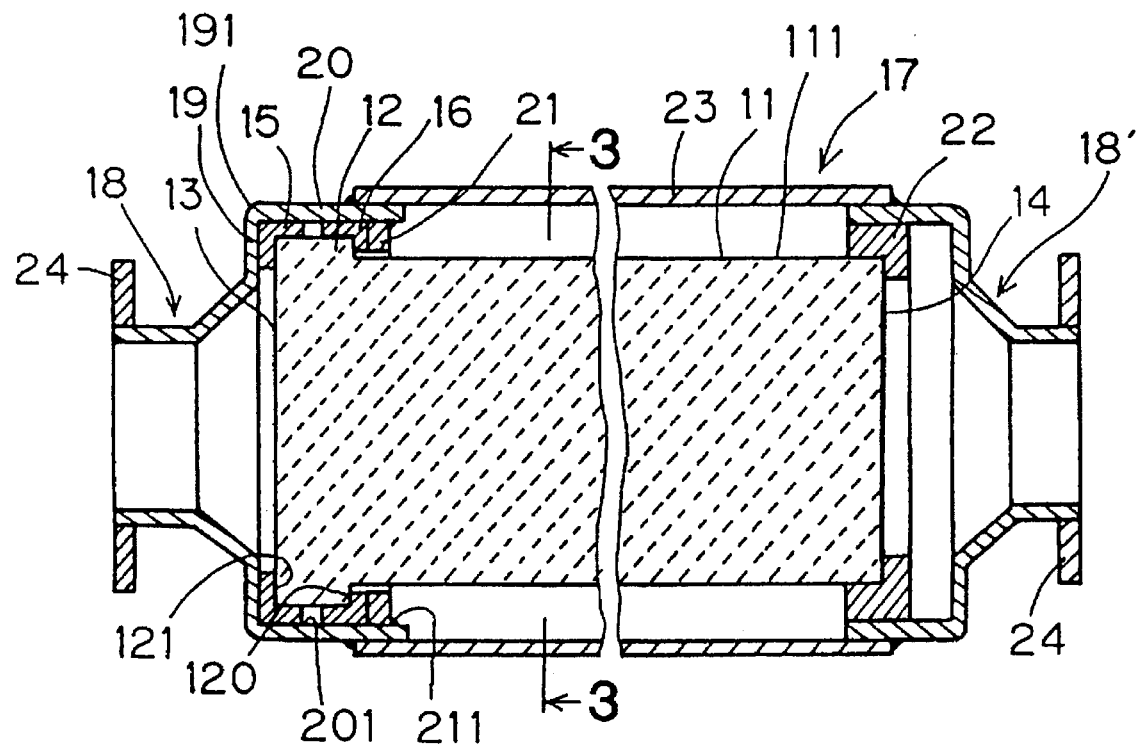
FIG. 2 is a vertical sectional view showing a first embodiment of a catalytic converter for cleaning exhaust gas in accordance with the present invention.
Figure 3:
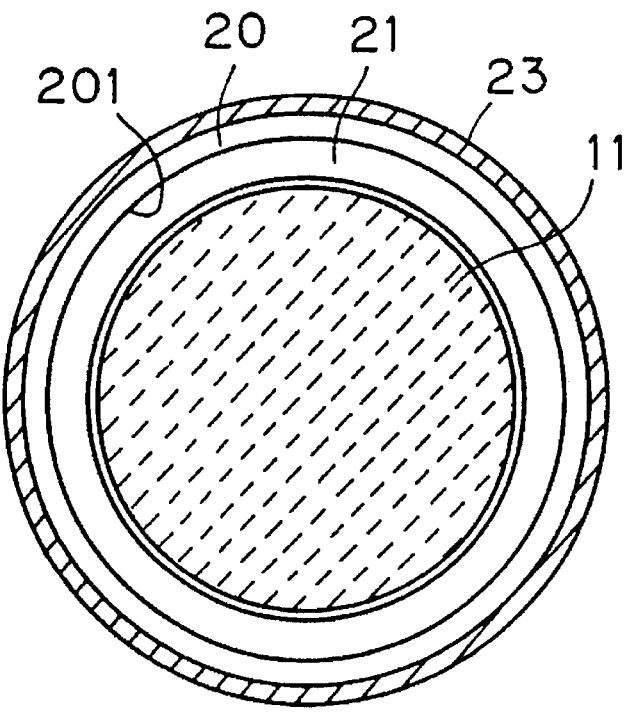
FIG. 3 is a sectional view taken on line 3—3 of FIG. 2.

Referring to FIGS. 2 and 3 showing a first embodiment, numeral 11 designates a ceramic honeycomb catalyst carrier. The catalyst carrier 11, which is cylindrical, is provided with a plurality of minute holes (referred to as "cells") passing through in the longitudinal direction thereof and arranged in a honeycomb shape, and holds catalysts for cleaning exhaust gas on the wall surfaces of the minute holes. The catalyst carrier 11 is supported and secured by a metal casing 17 which covers the catalyst carrier 11. The catalyst carrier 11 is secured only to the end cover 18 of the casing which is provided at the one end portion of the casing but not secured to the remainder of the casing 17, that is, the end cover 18' of the casing 17, which is provided at the other end portion, and the main portion 23 of the casing The structure of the securing portion is described below. At the one end portion of the honeycomb catalyst carrier 11 in the longitudinal direction thereof, the honeycomb catalyst carrier 11 has a flange portion 12 projecting outward from the outer peripheral surface 111 thereof.

A ring-shaped mesh washer 15 formed from a knitted wire mesh is mounted so as to cover the range from the end surface 121 of the flange portion 12, which coincides with the end surface 13 of the catalyst carrier 21, to the outer peripheral surface of the flange portion 12. The end cover 18 of the casing 17 is mounted on the mesh washer 15. The step portion 120 on the opposite side of the end surface 121 of the flange portion 12 is then pressed via a mesh washer 16 by a pushing ring 21, which is capable of being pushed into the space between the outer peripheral surface 111 of the honeycomb catalyst carrier 11 and the inner peripheral surface 201 of the sleeve portion 20 of the end cover 18, so that the end surface 121 is pressed via the mesh washer 15 used as a buffering member against the annular plate portion 19 (disposed perpendicularly to the longitudinal direction of the casing 17) of the end cover 18. The flange portion 12 is thus secured by being sandwiched between the annular plate portion 19 of the end cover 18 and the pushing ring 21 via the mesh washers 15, 16. In this sandwiched secured condition, the pushing ring 21 is firmly secured by welding or the like to the inner peripheral surface of the sleeve portion 20 extending from the outer peripheral fringe 191 of the annular plate portion 19 in the longitudinal direction of the casing 17. In this way, the securing portion is formed, in which the honeycomb catalyst carrier 11 is secured only to the one end of the casing 17. Numeral 211 in FIG. 2 shows the welded portion.

Figure 1:
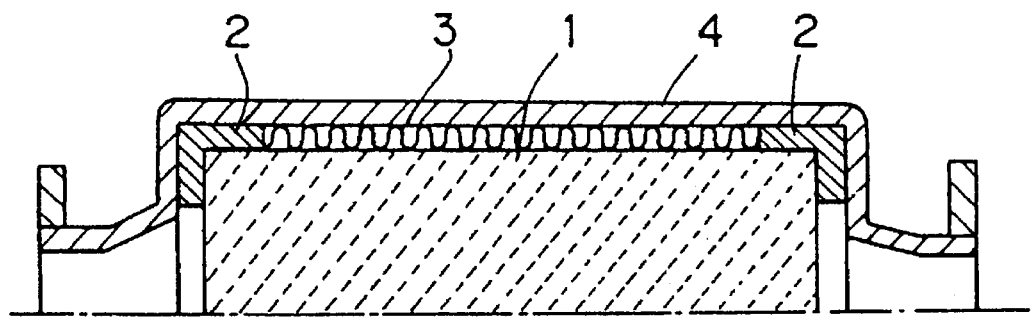
FIG. 1 is a vertical sectional view showing a conventional catalytic converter for cleaning exhaust gas.

In the securing portion, since the length of the flange portion 12 sandwiched as described above and secured to the casing 17 via the mesh washers 15 and 16 is short, the difference in thermal expansion and contraction generated by the difference in thermal expansion coefficient between ceramics and metal along the length is small. The difference can thus be absorbed easily by the mesh washers. Accordingly, the securing portion is scarcely affected by the difference in thermal expansion and contraction between ceramics and metal. The other end 14 of the honeycomb catalyst carrier 11 is loosely supported only by a mesh washer 22 used as a buffering member, but not secured to the end cover 18'. Therefore, the honeycomb catalyst carrier 11 can freely expand and contract thermally without being constrained by the end cover 18'. Numeral 24 in FIG. 1 designates a flange to be connected to an exhaust pipe (not shown).

Figure 4:
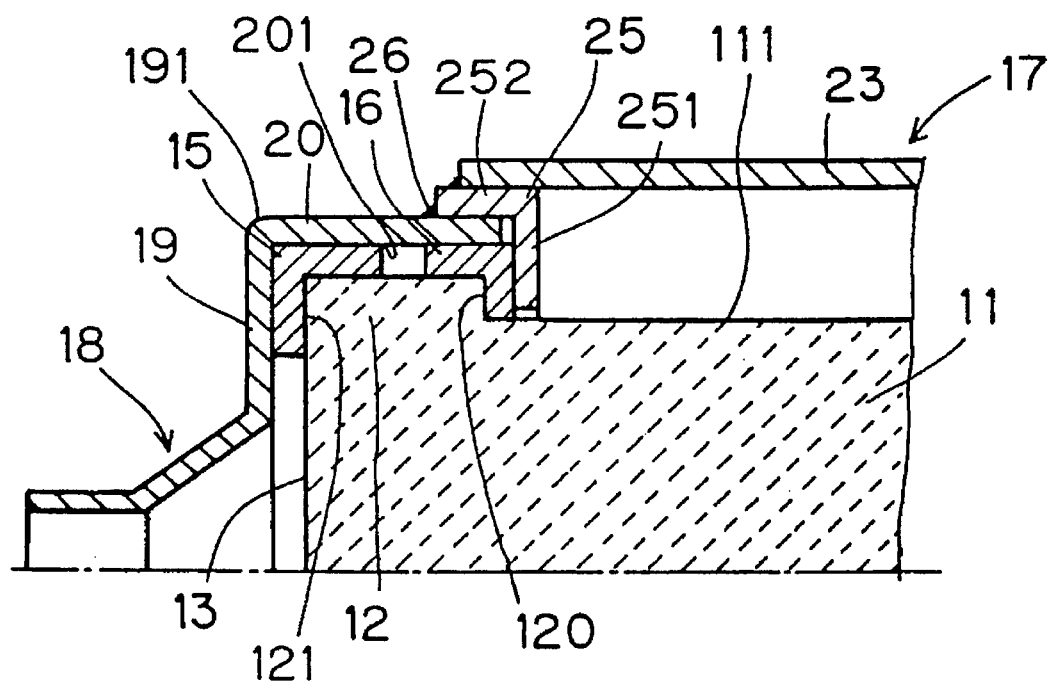
FIG. 4 is an enlarged vertical sectional view showing a main section of a second embodiment of the present invention.

A second embodiment shown in FIG. 4 differs from the first embodiment shown in FIG. 2 in that the shape of the pushing ring for pressing the step portion 120 of the flange portion 12 via the mesh washer 16 differs from the shape of the pushing ring of the first embodiment. In other respects, the second embodiment is identical to the first embodiment shown in FIG. 2. In the second embodiment, a pushing ring 25 is a ring having a reversed L-shaped cross section and provided with an annular pushing plate portion 251 disposed perpendicularly to the longitudinal direction of the casing 17 and a cylindrical sleeve portion 252 extending from the annular plate portion 251 to the end cover 18 in the longitudinal direction of the casing 17; the sleeve portion 252 is fit on the outer periphery of the sleeve portion 20 of the end cover 18; just as in the case of FIG. 2, the step portion 120 of the flange portion 12 is pressed by the pushing plate portion 251 of the pushing ring 25 via the mesh washer 16 so that the end surface 121 of the flange portion 12 of the honeycomb catalyst carrier 11 is pressed against the annular plate portion 19 of the end cover 18 via the mesh washer 15; in the pressed condition, the sleeve portion 252 of the pushing ring 25 is firmly secured by welding or the like to the sleeve portion 20 of the end cover 18. Numeral 26 designates a welded portion. Just as in the case of FIG. 2, the other end portion 14 of the honeycomb catalyst carrier 11 is loosely supported only by the mesh washer 22, but not secured to the casing 17, although the supporting condition is not shown in FIG. 4.

Figure 5:
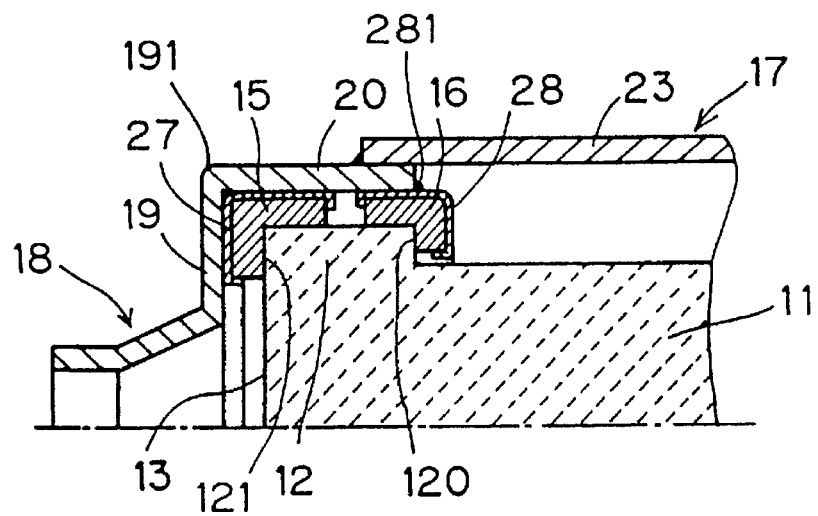
FIG. 5 is an enlarged vertical sectional view showing a main section of a third embodiment of the present invention.

In a third embodiment shown in FIG. 5, the mesh washers 15 and 16 are partially covered by a cover 27 and a pushing cover 28 made of metal, respectively. In addition, the metal washers 15 and 16 are integrally joined to these covers 27 and 28, respectively by welding, brazing, crimping or the like. Furthermore, the cover 27 and the pushing cover 28 are mounted between the end cover 18 and the flange portion 12 so that the covers 27 and 28 come into contact with the end cover 18, in other words, the mesh washers used as buffering members come into contact with the flange portion 12 of the honeycomb catalyst carrier 11 and the end surface 121 of the flange portion 12. The pushing cover 28 is pressed against the step portion 120 of the flange portion 12 and then secured firmly to the sleeve portion 20 of the end cover 18 by welding or the like in the pressed condition. The flange portion 12 of the honeycomb catalyst carrier 11 is thus sandwiched and secured between the annular plate portion 19 of the end cover 18 and the pushing cover 28 via the mesh washers 15 and 16 used as buffering members, thereby forming a securing portion for locally securing the one end of the honeycomb catalyst carrier 11 to the casing 17. Since the mesh washers 15 and 16 are integrated with the cover 27 and the pushing cover 28, respectively, this embodiment is advantageous in that the mesh washers 15 and 16 can be handled easily and can also be inserted and mounted easily. Moreover, since the mesh washers 15 and 16 are partially covered by the covers 27 and 28, this structure is effective in reducing gas passing through the mesh washers. Numeral 281 in FIG. 5 designates a welded portion.

Figure 6:
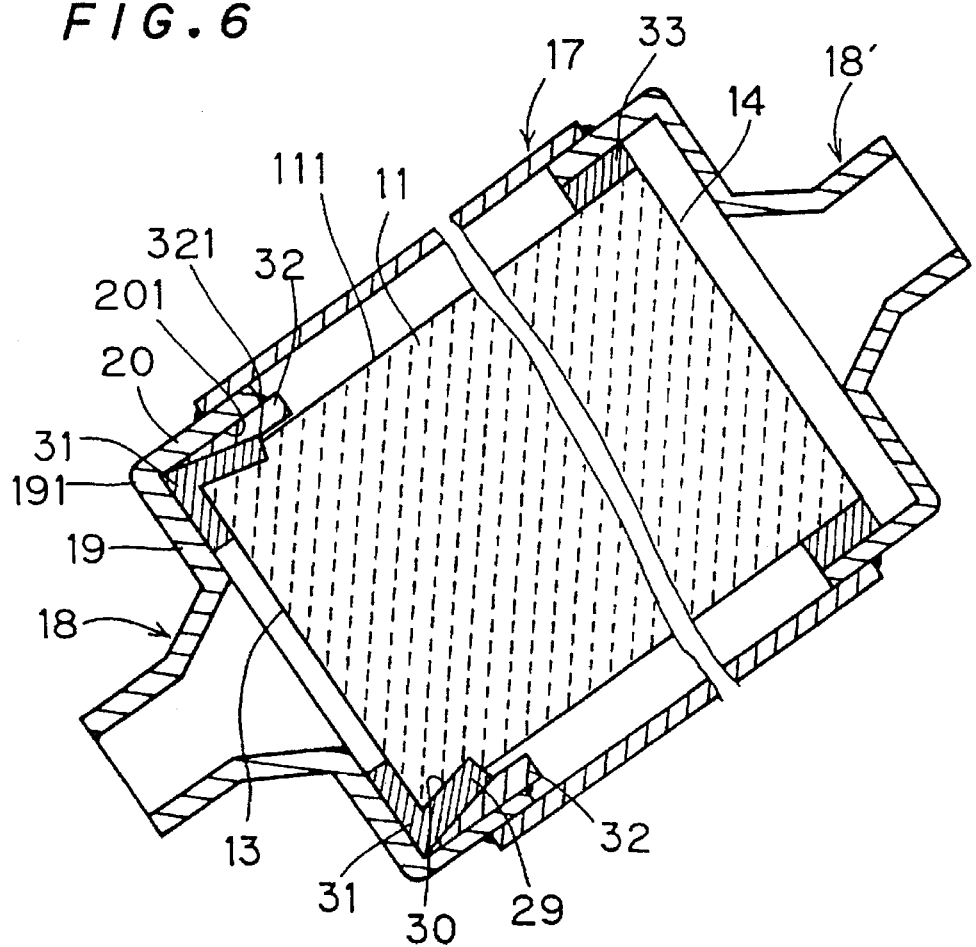
FIG. 6 is a vertical sectional view showing a fourth embodiment of the present invention.

In a fourth embodiment shown in FIG. 6, a recessed portion 29 having a peripheral surface 30 tapered inward from the end surface 13 of the honeycomb catalyst carrier 11 in the longitudinal direction thereof is provided on the outer peripheral surface 111 at the one end of the honeycomb catalyst carrier ii in the longitudinal direction thereof. By using this tapered recessed portion 29, the honeycomb catalyst carrier 11 is locally secured to the end cover 18 of the casing 17. A mesh washer ring (buffering member) 31 having an L-shaped cross section is mounted on the recessed portion 29 and the end surface 13, and in this condition the end cover 18 is further mounted on the honeycomb catalyst carrier 11 so that the annular plate portion 19 comes into contact with the mesh washer 31 mounted on the end surface 13. An annular taper bushing 32 having a wedge-shaped cross section is pushed into the space between the sleeve portion 20 of the end cover 18 and the mesh washer 31 mounted on the tapered peripheral surface 30 of the recessed portion 29. By the wedging effect of the taper bushing 32, the honeycomb catalyst carrier 11 is firmly secured to the end cover 18. In the pushed condition, the taper bushing 32 is firmly secured to the sleeve portion 20 by welding or the like. Numeral 321 designates a welded portion.

Since the other end 14 of the honeycomb catalyst carrier 11 is loosely supported only by a mesh supporter 33, but not secured to the casing 17, the honeycomb catalyst carrier 11 can freely expand and contract. Furthermore, in this embodiment, the entire structure of the ceramic honeycomb catalytic converter is inclined so that the one end of the honeycomb catalyst carrier 11, which is locally secured to the casing 17, is placed downward, and the other end thereof, which is not secured to the casing 17, is placed upward. By this inclined placement, the local securing of the honeycomb catalyst carrier 11 to the casing 17 can be made more effectively. Therefore, this type of inclined placement cannot be limited to the fourth embodiment, but can be advantageously applied to the first embodiment shown in FIG. 2, the second embodiment shown in FIG. 4 and the third embodiment shown in FIG. 5.

In the above-mentioned catalytic converter for cleaning exhaust gas in accordance with the present invention, the catalyst carrier 11 having a cylindrical shape may have an oval or rectangular cross section. Furthermore, the end cover 18' on the other end may be integrally formed together with the main portion 23 of the casing 17. Moreover, the catalytic converter in accordance with the present invention can be changed and modified without departing from the spirit of the present invention.

We claim:

1. A catalytic converter for cleaning exhaust gas comprising:

a catalyst carrier being made of ceramics and carrying catalysts therewith for cleaning exhaust gas passing therethrough, a metal casing for embracing, supporting and securing said catalyst carrier, and buffering members intervened between the casing and the catalyst carrier, wherein said casing is provided with an end cover separate from a main portion of said casing at least at either one end of said casing in the longitudinal direction thereof, and the catalyst carrier is secured to said end cover only at the one end of said casing via said buffering member, but not secured to the remainder of said casing.

2. A catalytic converter for cleaning exhaust gas according to claim 1, wherein said end cover at said one end comprises an annular plate portion perpendicular to the longitudinal direction of said casing and a cylindrical sleeve portion extending from the outer peripheral fringe of said annular plate portion in the longitudinal direction of said casing; said catalyst carrier is provided with a flange portion projecting outward form the outer peripheral surface at an end portion thereof to be covered with the end cover, the step portion on the opposite side of the end surface of said flange portion is pressed by a pushing ring via a first buffering member so that the end surface of said flange portion is pressed against said annular plate portion of the end cover via a second buffering member; and said pushing ring is secured to said sleeve portion of the end cover; thereby said catalyst carrier is secured to said end cover only at said one end of the casing.

3. A catalytic converter for cleaning exhaust gas according to claim 2, wherein said pushing ring is a ring plate capable of being pushed into the space between the outer peripheral surface of the catalyst carrier and the inner peripheral surface of said sleeve portion, and said pushing ring is welded to the inner peripheral surface of said sleeve portion.

4. A catalytic converter for cleaning exhaust gas according to claim 2, wherein said pushing ring comprises an annular pushing plate portion perpendicular to the longitudinal direction of said casing and a cylindrical sleeve portion extending from the outer peripheral fringe of said pushing plate portion in the longitudinal direction of said casing outside of the sleeve portion of the end cover, and said sleeve portion of the pushing ring is welded to the outer peripheral surface of said sleeve portion of the end cover.

5. A catalytic converter for cleaning exhaust gas according to claim 2, wherein said pushing ring is a metal cover which covers the outer surface of said first buffering member coming into contact with said flange portion of the catalyst carrier, said metal cover is integrally joined to said first buffering member, and said metal cover is welded to said sleeve portion of the end cover.

6. A catalytic converter for cleaning exhaust gas according to claim 1, wherein said end cover at said one end comprises an annular plate portion perpendicular to the axial direction of said casing and a cylindrical sleeve portion extending from the outer peripheral fringe of said annular plate portion in the axial direction of said casing; said catalyst carrier is provided with a recessed portion tapered inward in the axial direction from an outer peripheral fringe of the end surface of the on the outer surface of the end portion thereof to be covered with said end cover; said end cover is mounted on the recessed portion of the catalyst carrier and end surface adjacent thereto via the buffering member so that said annular plate portion of the end cover comes into contact with the end surface of the catalyst carrier via the buffering member; an annular tapered bushing having a wedge-shaped cross section is pushed into the space between the inner surface of the sleeve portion and the end cover and the outer surface of the buffering member mounted on the said recessed portion; and thus pushed tapered bushing is secured to the slope portion of the end cover; thereby said catalyst carrier secured to said end cover only at said one end of the casing.

7. A catalytic converter for cleaning exhaust gas according to claim 1, 2 or 6, wherein said buffering members are formed from a knitted metal wire.

8. A catalytic converter for cleaning exhaust gas according to claim 1, 2 or 6, wherein said casing is inclined in the axial direction thereof so that said end cover which secures the catalyst carrier is positioned downward.

* * * * *